United States Patent [19]
Brunet

[11] Patent Number: 5,973,430
[45] Date of Patent: *Oct. 26, 1999

[54] DEVICE FOR MOUNTING AND DRIVING A SPINDLE, PARTICULARLY A TEXTILE SPINDLE

[75] Inventor: Maurice Brunet, Ste. Colombe près Vernon, France

[73] Assignee: Societe De Mecanique Magnetique, Saint Marcel, France

[*] Notice: This patent issued on a continued prosecution application filed under 37 CFR 1.53(d), and is subject to the twenty year patent term provisions of 35 U.S.C. 154(a)(2).

[21] Appl. No.: 08/640,887
[22] PCT Filed: Nov. 8, 1994
[86] PCT No.: PCT/FR94/01303
 § 371 Date: May 3, 1996
 § 102(e) Date: May 3, 1996
[87] PCT Pub. No.: WO95/13480
 PCT Pub. Date: May 18, 1995

[30] Foreign Application Priority Data

Nov. 9, 1993 [FR] France .................................. 93 13332

[51] Int. Cl.⁶ .................................................. F16C 39/06
[52] U.S. Cl. .......................................................... 310/90.5
[58] Field of Search ............................ 310/90.5; 277/174

[56] References Cited

U.S. PATENT DOCUMENTS

| | | | |
|---|---|---|---|
| 3,888,553 | 6/1975 | Wehde | 310/154 |
| 4,023,920 | 5/1977 | Baechler et al. | 417/354 |
| 4,180,946 | 1/1980 | Heijkenskjold | 51/134.5 |
| 4,389,849 | 6/1983 | Gasser et al. | 310/90.5 |
| 4,415,823 | 11/1983 | Juergens | 310/90.5 |
| 4,473,259 | 9/1984 | Goldowsky | 308/10 |
| 4,692,699 | 9/1987 | Brunet et al. | 310/90.5 |
| 4,755,709 | 7/1988 | De Jager | 310/90.5 |
| 4,763,032 | 8/1988 | Bramm et al. | 310/90.5 |
| 4,810,917 | 3/1989 | Kumar et al. | 310/68 R |
| 4,918,345 | 4/1990 | Vaillant De Guelis et al. | 310/90.5 |
| 4,956,945 | 9/1990 | Ooshima | 51/165.93 |
| 4,982,126 | 1/1991 | Jolivet et al. | 310/90 |
| 5,007,972 | 4/1991 | Kumar et al. | 148/102 |
| 5,032,751 | 7/1991 | Morita | 310/90.5 |
| 5,059,092 | 10/1991 | Kabelitz et al. | 415/90 |

FOREIGN PATENT DOCUMENTS

| | | |
|---|---|---|
| 0 512 516 | 5/1992 | European Pat. Off. . |
| 2-35217 | 2/1990 | Japan . |

OTHER PUBLICATIONS

Von Winfreid Hörsemann, Prezessregelung beim Innenrundschleifen mit aktiv magnetgelagerten Spindeln', VDI—Zeitschrift, vol. 132, No. 12, Dec. 1990, pp. 77–79.

Primary Examiner—Nestor Ramirez
Assistant Examiner—Burton S. Mullins
Attorney, Agent, or Firm—McDermott, Will & Emery

[57] ABSTRACT

A device for mounting and driving a tubular spindle (10) has first and second axial-flux radial active magnetic bearings (60, 70) disposed respectively at a first end of the tube (10) and at a second end thereof. Each of the radial active magnetic bearings (60, 70), between which an electric motor (80) is interposed, includes a stator magnetic circuit made up of two subassemblies (61, 62; 71, 72) each of four axial-flux slot-free touching elements distributed around the tube (10). A mechanism is also provided for establishing a reduced pressure, of the order of a few hundreds of Pascals to a few thousands of Pascals, inside the spindle in the air gaps of the radial magnetic bearings (60, 70) and of the electric motor (80).

12 Claims, 2 Drawing Sheets

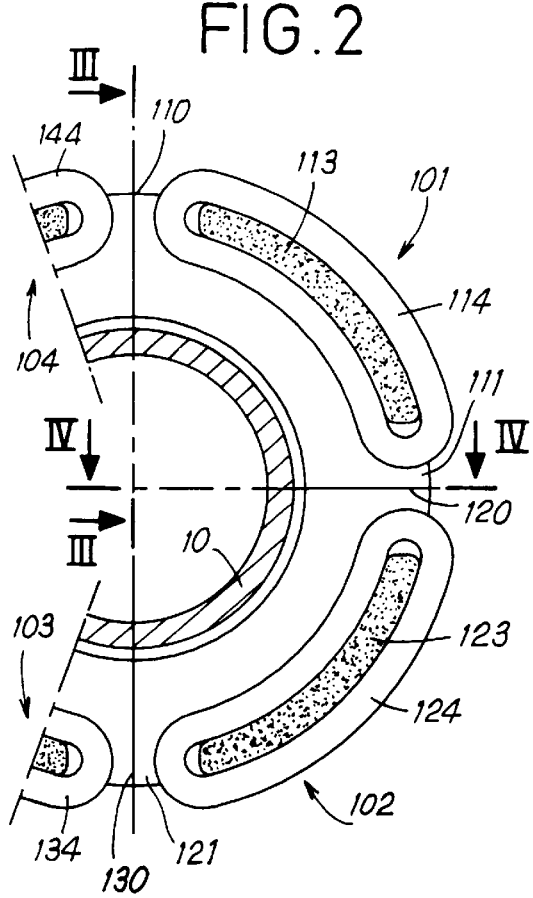
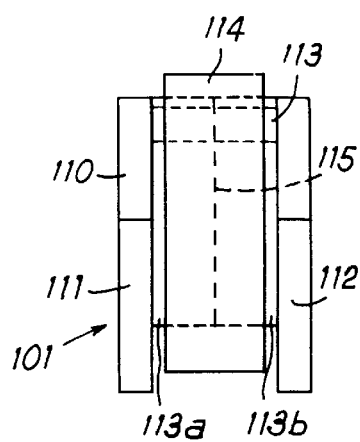
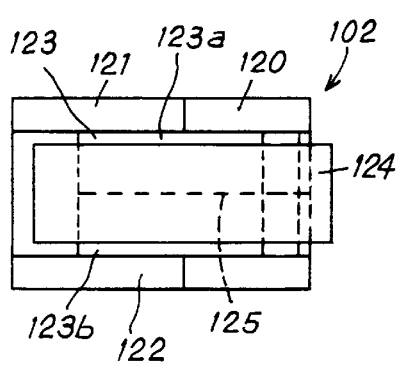
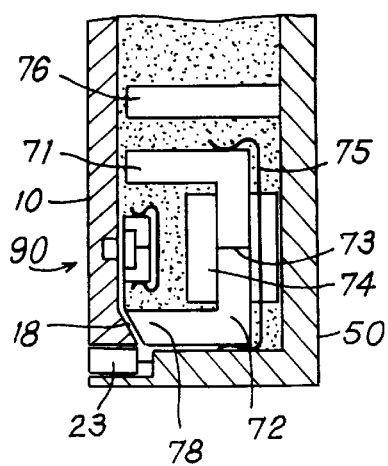

DEVICE FOR MOUNTING AND DRIVING A SPINDLE, PARTICULARLY A TEXTILE SPINDLE

FIELD OF THE INVENTION

The present invention relates to a device for mounting and driving a textile spindle, comprising a tube which is mounted relative to a frame by means of first and second radial bearings and which is rotated by means of an electric motor.

BACKGROUND OF THE PRIOR ART

Various types of spindle are known that are required to rotate at high speed, in particular textile spindles for spinning. An example of such a spindle comprises a vertical tube that may have an inside diameter of the order of 30 mm to 40 mm, that is mounted in a frame inside a housing with predetermined clearance so as to allow the tube to rotate without making contact with the wall of the housing. The top portion of the tube is extended by a portion of smaller diameter mounted on conventional bearings such as ball bearings, and it is rotated by an electric motor. A thread to be put into the form of a spool is inserted into the tube within which it can be driven by centrifugal force against the inside wall of the tube so as to make up a spool of thread inside the tube, which spool is subsequently extracted from the tube via the opening at the bottom. The tube is rotated by the motor at rotary speeds of about 300 revolutions per second (rps), for example.

Spindles of this type, fitted with a mechanical suspension based on ball bearings and mounted in a cantilever configuration are subjected to instabilities of rotation that lead to disturbances in the centrifugal effect and that reduce the lifetime of the device. In addition, the dimensions of the spindle and its speed of rotation are limited by the mechanical suspension used, thereby reducing production capacities and rates.

SUMMARY OF THE INVENTION

The present invention seeks to remedy the above-specified drawbacks and to enable rotary tubular members such as spindles to be mounted in such a manner that reliability, lifetime, and production capacity are increased.

Another object of the invention is to provide a spindle mounting having a minimum of disturbance to the centrifugal effect and in which aerodynamic friction losses are also very greatly reduced.

These objects are achieved by a device for mounting and driving a spindle, in particular a textile spindle comprising a tube mounted relative to a frame by means of first and second radial bearings and rotated by means of an electric motor, the device being characterized in that the tube is mounted without contact relative to the frame which is in the form of a casing, by means of first and second axial-flux radial active magnetic bearings disposed respectively at a first end of the tube and at a second end thereof, with said electric motor being disposed between them, in that each of the radial active magnetic bearings comprises a stator magnetic circuit made up of four axial-flux slot-free touching elements distributed around the tube, and in that means are provided to create a reduced pressure of the order of a few hundreds of Pascals to a few thousands of Pascals inside the spindle in the air gaps of the radial magnetic bearings and of the electric motor.

Because of the absence of mechanical contact between the tube and the frame, due to using an active magnetic suspension, the spindle of the invention presents increased reliability and lifetime. The suction created in the air gap of the radial magnetic bearings and of the electric motor contributes to significantly reducing aerodynamic friction losses, even at high speeds of rotation of about 800 rps to 1,000 rps, for example.

In spite of using a tubular rotor that is solid, i.e. not laminated, the electromagnetic losses in the rotor co-operating with the radial magnetic bearings are very small because of the use of axial-flux stator magnetic circuits made up of a plurality of slot-free elements that touch.

According to a particularly advantageous characteristic that simplifies assembly, each stator magnetic circuit comprising four touching elements of the radial active magnetic bearings is made up of two subassemblies each comprising four touching elements, the subassemblies being united in a radial join plane and being held together by clamps or clips.

This type of assembly contributes to simplifying and reducing the cost of manufacturing the device as a whole.

Preferably, the stator magnetic circuits of the radial active magnetic bearings are made of iron powder comprising insulated particles compacted by hot isostatic pressing.

In a particular embodiment, at least one of the first and second radial active magnetic bearings includes a stator magnetic circuit having a second subassembly of four touching elements which is asymmetrical relative to the first subassembly of four touching elements, so as to act also as an axial bearing co-operating with a horizontal flange of the tube.

The reduced pressure in the air gaps of the radial magnetic bearings and of the electric motor is of the order of 1,300 Pascals, can be implemented during initial assembly or can be permanently maintained in operation by means of a low-rate vacuum pump.

The spindle of the invention can include a floating sealing ring at at least one of its ends and fixed to the casing of the spindle by means of a flexible membrane.

In which case, the floating ring can be made of graphite, ceramic, or carbon, such as amorphous diamond-like carbon (ADLC), and can present a flexible stroke in the radial direction that is limited to a few hundredths of a millimeter so as also to constitute an emergency bearing.

Other characteristics and advantages of the invention appear from the following description of particular embodiments of the invention given as non-limiting examples, with reference to the accompanying drawings.

BRIEF DESCRIPTION OF THE DRAWINGS

FIG. 2 is a section view in a radial join plane through a set of electromagnets constituting a radial active magnetic bearing of a particular embodiment of the invention;

FIGS. 3 and 4 are section views respectively on lines III—III and IV—IV of FIG. 2; and FIG. 5 is a detail view in axial section showing a variant embodiment of a radial active magnetic bearing which is applicable to the present invention and which also acts as an axial magnetic bearing.

DETAILED DESCRIPTION OF THE PREFERRED EMBODIMENTS

Figure 1:
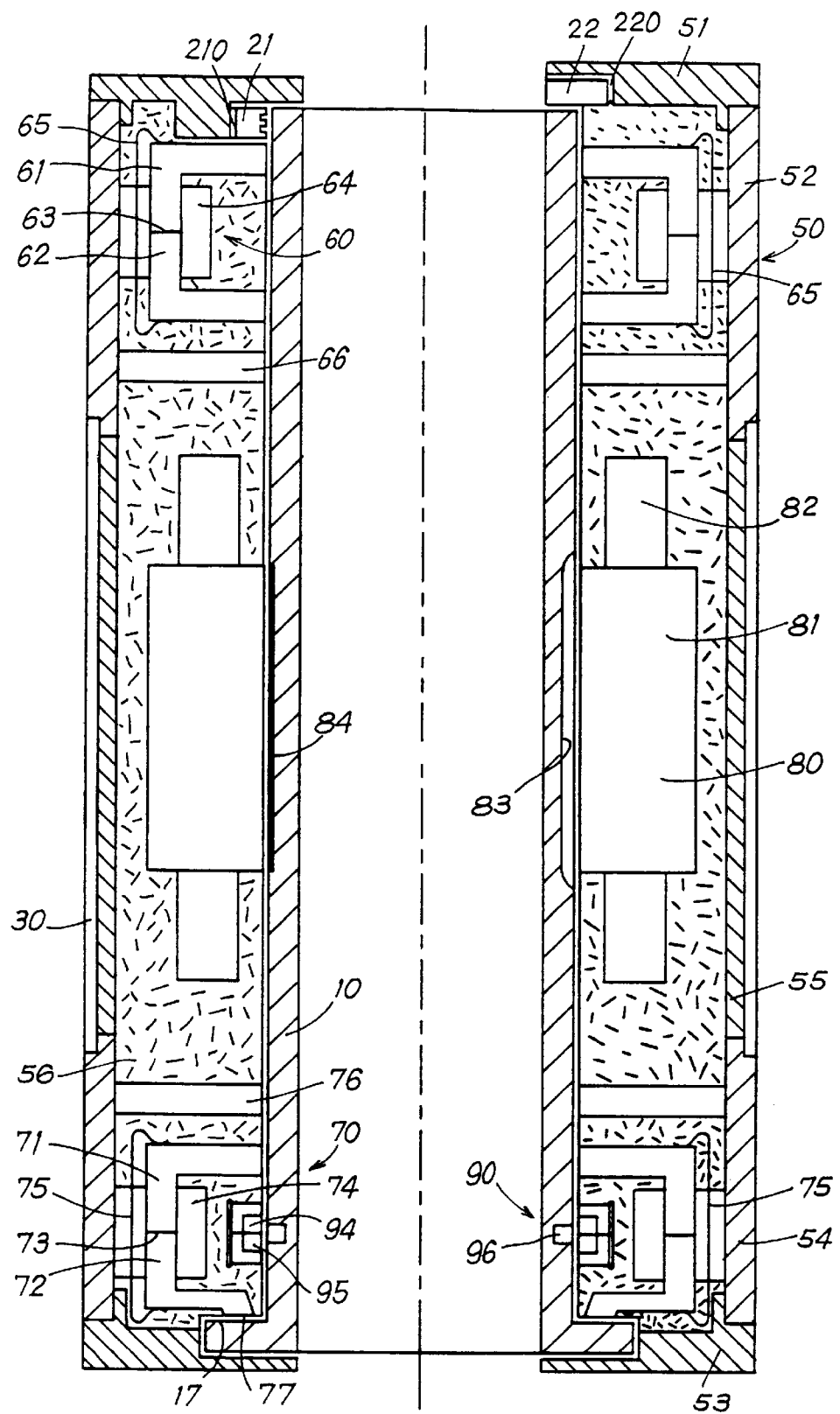
FIG. 1 is an axial section view of a particular embodiment of a device of the present invention for mounting and driving a spindle.

FIG. 1 shows an example of a device in accordance with the invention for mounting and driving a spindle such as a textile spindle for spinning, which is advantageously positioned vertically.

An outer casing 50 is made up of a plurality of juxtaposed cylindrical elements 52, 54, and 55 together with end walls 51 and 53 which are separate in order to facilitate assembly of the elements incorporated within the casing 50.

A metal tube 10 that may, for example, be about 200 mm long with an inside diameter of about 30 mm to 50 mm, is mounted without contact inside the casing 50 by means of a top radial active magnetic bearing 60 and a bottom radial active magnetic bearing 70 whose structure is described in greater detail below.

An electric motor 80 is disposed between the radial magnetic bearings 60 and 70, it may be of the asynchronous type having a solid rotor and comprising a stator inductor 81 provided with windings 82. The outside surface of the tube 10 is preferably covered in a thin deposit of copper 84 or is provided with fluting 83 in its portion facing the electric motor 80 provided for rotating the tube 10 so as to reduce losses due to slip. However, the tube 10 remains solid, i.e. without special lamination in its top and bottom portions situated facing the radial magnetic bearings 60 and 70.

A flexible printed circuit 30 is disposed on the casing 50 in the vicinity of its central portion 55. Connections with wires (not shown in the drawing) for feeding the windings 82 of the motor 80, the coils 64, 74 of the radial bearings 60, 70, and the detectors 66, 76 for detecting the position of the rotor 10 are all made via the flexible printed circuit 30 which also includes connectors for coupling to external circuits for controlling the motor 80 and the magnetic bearings 60 and 70.

Advantageously, the various elements for rotating the tube 10 and for its suspension are integrated within the casing 50 by overmolding, and they occupy positions that are accurately defined relative to the tube 10.

In operation, the tube 10 constituting the rotating spindle can be rotated at speeds of about 800 rps to 1,000 rps. The active magnetic bearings 60 and 70 and the electric motor 80 are entirely adapted to making such speeds of rotation possible for the tube 10. However, in ordinary operating conditions, under ambient pressure of about 1 bar, and when the spindle comprises a tube 10 having an inside diameter of about 40 mm to 50 mm, rotating at a speed of about 900 rps with an air gap of about 1 mm, the aerodynamic losses in the air gaps of the magnetic bearings 60 and 70 and of the motor 80 lie in the range about 200 watts to about 400 watts, and that can impede proper operation of the system.

According to the invention, to remedy the above drawback, the ambient pressure inside the rotary machine is reduced to a value lying in the range a few hundreds of Pascals to a few thousands of Pascals, to about 1,300 Pascals. As a result, losses by aerodynamic friction in the air gaps of the magnetic bearings and of the motor are considerably reduced, and the system can operate very well at a high speed of rotation which leads to excellent efficiency.

The reduced pressure in the air gap between the tube 10 and the stationary elements held in place by overmolding can be established during an initial step of putting the spindle into operation, or it can be maintained permanently in operation by a very low rate vacuum pump associated with the spindle.

Good sealing at the outlet of the rotor 10 is provided by a floating ring 21 or 22 centered by an air bearing effect around the rotor 10 and secured by a flexible membrane 210 or 220 to the endpiece 51 constituting an end wall of the casing 50. A floating bearing similar to one of the rings 21 or 22 may also be held by means of a flexible membrane to the bottom endpiece 53 of the casing 50.

As shown in the two half-views at the top of FIG. 1, the floating sealing ring for keeping air pressure low in the air gap of the spindle can be mounted to be flexible in the axial direction (ring 22) or in the radial direction (ring 21), depending on the type of sealing required. A floating ring that is flexible in the radial direction, such as the ring 21, is generally more favorable for avoiding loading due to atmospheric pressure.

In addition, a floating sealing ring such as the ring 21 can also serve as a smooth auxiliary bearing if it is made, at least in part, out of a material selected from the family of carbons or graphites. More particularly, a floating ring serving as a smooth auxiliary bearing can have a contact surface made of ceramic or of amorphous diamond-like carbon (ADLC). To perform its function of a sealing ring and an emergency bearing properly, a floating ring may have its flexible stroke limited to a few hundredths of a millimeter and it may be made in such a manner as to return to positive thrust at a distance of about 0.10 mm to 0.15 mm so that it then acts as an emergency bearing in the event of the active magnetic suspension failing or stopping. It will be observed that the flexible fixing of the sealing ring that also acts as an emergency bearing contributes to damping vibrations in the event of landing.

There follows a more detailed description of an example of active magnetic bearings that simultaneously present a configuration optimizing their operation and are particularly easy to assemble, thus facilitating manufacture of the spindle.

The radial magnetic bearings 60, 70 co-operate directly with the solid wall of the tube 10 made of ferromagnetic material, and they comprise stators of a shape such as to minimize variations in magnetic field. The electromagnets of the stators of the radial bearings 60 and 70 are of homopolar form, i.e. they provide axial flux. Advantageously, they present an electromagnet yoke made up of two portions 61, 62 or 71, 72 that are pressed against each other in respective join planes 63 and 73 lying in radial planes. Clamps or clips 65 or 75 serve to keep the two halves 61, 62 or 71, 72 of each yoke pressed against each other. See FIG. 5. The coils 64 or 74 can easily be prefabricated and installed around a first yoke portion 61 or 71 prior to assembling together the two portions 61 & 62 or 71 & 72.

The electromagnets 61, 62 and 71, 72 can be made of iron powder comprising insulated particles that are compacted by isostatic pressing, thus enabling them to be made exactly to dimensions without any machining being necessary.

According to an important characteristic, shown in FIGS. 2 to 4, the stator of each radial magnetic bearing 60, 70 is made up of four touching axial-flux elements 101 to 104 without any slots between the four elements. This contributes to avoiding magnetic losses in the rotor when the spindle is in the vertical position, and to reducing such losses considerably in the horizontal position.

FIG. 2 shows the four touching elements 101 to 104 of a radial bearing electromagnet distributed around a central passage in which the tube 10 constituting the rotor of the magnetic bearing is engaged and via which the magnetic field lines are looped. FIGS. 3 and 4 show the elements 101 and 102 on the righthand side of FIG. 2 in greater detail. All four elements 101 to 104 include a respective coil 114, 124, 134, and 144, and they are identical.

The element 101 has a U-shaped structure with two parallel side branches 111 and 112 each in the form of one-fourth of an annulus and each disposed in a respective radial plane, together with an arcuate branch 113 uniting the side branches 111 and 112, with a coil 114 being disposed thereabout. As mentioned above, assembly is facilitated if each element such as the element 101 is made up of two separate portions meeting in a join plane 115 situated in a radial plane. By subdividing the arcuate branch 113 into two halves 113a and 113b secured to respective plane parallel branches 111 and 112 it is easy to insert a prefabricated coil 114 prior to clipping together the two halves of the magnetic circuit 111, 113a with 112, 113b.

The element 102 has component parts 121, 122, 123a, 123b, 124, and 125 which are absolutely identical to the component parts 111, 112, 113a, 113b, 114, and 115 of the elements 101 and the elements 103 and 104 likewise present the same structure. The elements 101, 102, 103, and 104 are in contact with one another in axial planes 110, 120, and 130 occupying a cross configuration. The various kidney-shaped stator coils 114, 124, 134, and 144 distributed around the tube 10 are of a shape that reduces variation in the radial magnetic field over one turn while leaving between them small empty spaces that enable the two electromagnet halves to be clipped together by means of clips 65, 75 (FIG. 1).

The radial active magnetic bearings 60, 70 are fitted in conventional manner with means for detecting variations in the air gap between the electromagnets of the stator and the rotor 10. By way of example, FIG. 1 shows radial detectors 66, 76 disposed in the vicinity of the radial bearings 60, 70.

The detectors 66, 76 may be implemented in a very wide variety of ways, and they may be of the conical type having successive poles around one turn or of the homopolar type (having axial flux) like the electro-magnets of the bearing so as to make them less sensitive to interference from the adjacent electric motor 80. The detectors 66, 76 operate directly in repulsion against the solid rotor 10, without any bunch of laminations being applied to the rotor, using a carrier frequency that may be as little as less than 50 kHz. More particularly, the detectors 66 and 76 are advantageously likewise made out of iron powder comprising insulated particles compacted by isostatic pressing.

Other known means for detecting the position of the rotor 10 relative to the magnetic bearings 60, 70 may naturally be used.

One or more axial active magnetic bearings may also be used so as to hold the rotor 10 axially relative to the frame.

In FIG. 1, a tube 10 is shown as having a flange 17 at its bottom end which co-operates with the free end 77 of the bottom portion 72 of the electromagnet of the radial bearing 70. As a result, the magnetic bearing 70 also serves as an axial bearing for the tube 10. An axial detector 90 is disposed facing the tube 10 concentrically with the coil 74 of the magnetic bearing 70. The axial detector 90 may comprise stator elements 94, 95 co-operating with an insert 96 disposed in the wall of the tube 10 level with the elements 94 and 95.

FIG. 5 shows a variant embodiment in which the bottom portion 72 of the electromagnet of the magnetic bearing 70 constitutes a conical pole piece 78 co-operating with a free end 18 of the tube 10 which is likewise conical so as to create a bearing that acts both radially and axially. FIG. 5 also shows a floating sealing ring 23 which may be analogous to the top ring 22.

Although the present invention has been described and illustrated in detail, it should be clearly understood that the same is by way of illustration and example only and is not to be taken by way of limitation, the spirit and scope of the present invention being limited only by the terms of the appended claims.

I claim:

1. A device for mounting and driving a spindle, in particular a textile spindle comprising a hollow tube mounted relative to a frame by first and second axial-flux radial active magnetic bearings and rotated about an axis of the tube by an electric motor, the device being characterized in that the tube is mounted without contact relative to the frame which is in the form of a casing, by the first and second bearings respectively disposed at first and second ends of the tube, with said electric motor being disposed between them, said first and second bearings and said electric motor having respective air gaps, in that each of the first and second bearings comprises a stator magnetic circuit made up of four discrete axial-flux elements distributed around the tube, each axial-flux element having a contact surface of prescribed length which is in continuous abutment with the contact surface of an adjacent one of the axial-flux elements along the entirety of the prescribed lengths of both abutting contact surfaces, and in that means are provided to create a reduced pressure in the air gaps of the first and second bearings and of the electric motor.

2. The device according to claim 1, wherein:
   each stator magnetic circuit comprising four touching elements of the radial active magnetic bearings is made up of two subassemblies each comprising four touching elements, the subassemblies being united in a join plane which extends substantially perpendicularly to said axis of the tube and being held together by one of clamps or clips.

3. The device according to claim 1, wherein:
   the stator magnetic circuit of each of the first and second bearings is made of iron powder comprising insulated particles compacted by hot isostatic pressing.

4. The device according to claim 2, wherein:
   at least one of the first and second bearings includes a stator magnetic circuit having a second subassembly of four touching elements which is asymmetrical relative to the first subassembly of four touching elements, and the tube comprises a flange extending substantially perpendicularly to said axis of the tube, with said second subassembly co-operating with said flange so as to form an axial magnetic bearing for the tube.

5. The device according to claim 1, wherein:
   the reduced pressure in the air gaps of the first and second bearings and of the electric motor is of the order of 1,300 Pascals.

6. The device according to claim 1, wherein:
   the reduced pressure in the air gaps of the first and second bearings and of the electric motor is established during initial assembly of the device.

7. The device according to claim 1, wherein:
   the reduced pressure in the air gaps of the first and second bearings and of the electric motor is maintained during operation of the device by means of a low rate vacuum pump.

8. The device according to claim 1, further including:
   a floating sealing ring disposed at least one end of the device and connected to the casing of the spindle by means of a flexible membrane.

9. The device according to claim 1, further including:
   a floating sealing ring disposed at least one end of the device and connected to the casing of the spindle by means of a flexible membrane, said floating sealing ring being made of one of graphite, ceramic, and amorphous diamond-like carbon ADLC, presenting a flexible stroke in the radial direction that is limited to a few hundredths of a millimeter, and being disposed so as also to serve as an emergency bearing for the tube.

10. The device according to claim 1, further including:
a flexible printed circuit fixed to the casing in the form of a ring outside the electric motor and connected to the first and second bearings and the electric motor.

11. The device according to claim 1, further including:
radial and axial detectors made of an iron powder comprising particles which are compacted by hot isostatic pressing.

12. The device according to claim 1, wherein:
the electric motor comprises a stator element, and
wherein said stator element and said stator magnetic circuits of the first and second bearings are integrated within the casing by overmolding.

* * * * *